United States Patent
Dorai et al.

(10) Patent No.: US 10,243,821 B2
(45) Date of Patent: Mar. 26, 2019

(54) OAM MECHANISMS FOR EVPN ACTIVE-ACTIVE SERVICES

(71) Applicant: Juniper Networks, Inc., Sunnyvale, CA (US)

(72) Inventors: Rukesh Dorai, Sunnyvale, CA (US); Tapraj Singh, San Ramon, CA (US); Sunesh Rustagi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 117 days.

(21) Appl. No.: 14/984,026

(22) Filed: Dec. 30, 2015

(65) Prior Publication Data
US 2017/0195199 A1   Jul. 6, 2017

(51) Int. Cl.
| | |
|---|---|
| *H04L 12/26* | (2006.01) |
| *H04L 12/46* | (2006.01) |
| *H04L 12/24* | (2006.01) |
| *H04L 12/703* | (2013.01) |
| *H04L 12/761* | (2013.01) |
| *H04L 12/707* | (2013.01) |

(52) U.S. Cl.
CPC ...... *H04L 43/0811* (2013.01); *H04L 12/4641* (2013.01); *H04L 41/0213* (2013.01); *H04L 41/0663* (2013.01); *H04L 45/28* (2013.01); *H04L 41/0645* (2013.01); *H04L 41/0813* (2013.01); *H04L 45/16* (2013.01); *H04L 45/22* (2013.01); *H04L 45/24* (2013.01)

(58) Field of Classification Search
CPC .................................................. H04L 43/0811
See application file for complete search history.

(56) References Cited

U.S. PATENT DOCUMENTS

| | | |
|---|---|---|
| 7,990,993 B1 | 8/2011 | Ghosh et al. |
| 7,995,483 B1 | 8/2011 | Bayar et al. |

(Continued)

FOREIGN PATENT DOCUMENTS

EP       2367320 A1     9/2011

OTHER PUBLICATIONS

IEEE, 802.1AX Standard, "IEEE Standard for Local and Metropolitan Area Networks—Link Aggregation," Nov. 3, 2008, 158 pp.

(Continued)

*Primary Examiner* — John D Blanton
(74) *Attorney, Agent, or Firm* — Shumaker & Sieffert, P.A.

(57) ABSTRACT

A method and network device to execute an Ethernet Virtual Private Network (EVPN) protocol to configure the network device to participate as one of a plurality of customer edge (CE) routers that provide an active-active configuration for an Ethernet segment coupling the CE routers to a plurality of provider edge (PE) routers, wherein the processor is configured to determine whether a packet that is to be forwarded is an operations, administration, and management (OAM) packet; in response to determining that the packet comprises an OAM packet, replicate the OAM packet for one or more interface links of an Ethernet segment associated with the CE router; configure forwarding instructions to the one or more interface links of the Ethernet segment associated with the CE router; and forward the OAM packet and the replicated OAM packets to the PE routers.

25 Claims, 9 Drawing Sheets

(56) References Cited

U.S. PATENT DOCUMENTS

2014/0078884 A1* 3/2014 Shukla ............... H04L 43/0811
                                                    370/216
2017/0141963 A1* 5/2017 Chalapathy ............ H04L 41/12

OTHER PUBLICATIONS

IEEE 802.1ag-2007 Standard, "IEEE Standard for Local and Metropolitan Area Networks—Virtual Bridged Local Area Networks—Amendment 5: Connectivity Fault Management," draft standard, LAN MAN Standards Committee, dated Dec. 17, 2007, 259 pp.

IEEE 9 802.1ag and ITU-T Standardization Sector Recommendation Y.1731, "OAM Functions and Mechanisms for Ethernet Based Networks," ITUT Study Group 13 (2005-2008), May 22, 2006, 80 pp.

Extended Search Report from counterpart European Application No. 16204544.7, dated May 11, 2017, 10 pp.

Response to Extended Search Report dated May 11, 2017, from counterpart European Application No. 16204544.7, filed Jan. 5, 2018, 22 pp.

Communication pursuant to Article 94(3) dated Sep. 20, 2018 received in counterpart EP Application No. 16204544.7, 5 pp.

Response filed Jan. 17, 2019 to the Communication pursuant to Article 94(3) dated Sep. 20, 2018 received in counterpart EP Application No. 16204544.7, 10 pp.

* cited by examiner

OAM MECHANISMS FOR EVPN ACTIVE-ACTIVE SERVICES

TECHNICAL FIELD

The techniques of this disclosure relate to packet-based computer networks and, more particularly, to forwarding packets within computer networks.

BACKGROUND

A computer network is a collection of interconnected computing devices that can exchange data and share resources. In a packet-based network, computing devices include layer two devices that operate within the second layer (L2) of the Open Systems Interconnection (OSI) reference model (i.e., the data link layer) and layer three devices that operate within the third layer (L3) of the OSI reference model (i.e., the network layer). These computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form.

Network devices within computer networks often include a routing engine that provides control plane functionality for the network device. The routing engine provides control plane functions storing network topology in the form of routing tables, executing routing protocols to communicate with peer routing devices and maintain and update the routing tables, and providing a management interface to allow user access and configuration of the network device. The routing engine maintains routing information that describes a topology of a network, and derives a forwarding information structure (e.g., a forwarding information base (FIB)) in accordance with the routing information. In general, the routing information represents the overall topology of the network and defines routes to destinations/prefixes within the network.

Forwarding information is generated based on selection of certain routes within the network and maps packet key information (e.g., destination information and other select information from a packet header) to one or more specific next hops and ultimately to one or more specific output interfaces of interface cards of the network device. Typically, the routing engine installs forwarding structures into each of the PFEs to control forwarding of traffic within the data plane. This allows the FIB in each of PFEs to be updated without degrading packet forwarding performance of routing node. In some instances, the routing engine may drive separate FIBs which are copied to respective PFEs.

SUMMARY

In general, techniques are described by which a data-forwarding network device, such as a switch or a router, allows for an internal routing engine to forward Operations, Administration and Maintenance (OAM) packets on all links associated with the network device of an Ethernet segment. More particularly, these techniques may be performed by a multi-homed customer edge (CE) network device, i.e., a CE network device coupled to a plurality of provider edge (PE) network devices. The techniques allow for the routing engine of the CE device to replicate OAM packet frames and forward the OAM packets to all network devices on member links of an aggregated Ethernet.

The techniques described herein enable network devices to detect failures in an EVPN Active-Active topology within the service/logical-interface level for each link associated with the network device of an Ethernet segment.

For example, a method may include determining, by a multi-homed CE router coupled by an intermediate network to a plurality of PE routers that provide an active-active configuration for an EVPN, whether a packet that is to be forwarded is an OAM packet. The method further includes, in response to determining that the packet comprises an OAM packet, replicating, by the CE router, the OAM packet for one or more interface links of an Ethernet segment associated with the CE router. The method also includes configuring forwarding instructions to the one or more interface links of the Ethernet segment associated with the CE router. In addition, the method includes forwarding the OAM packet and the replicated OAM packets to the PE routers.

In another example, a method may include detecting, by at least one of a plurality of provider edge PE routers that provide an active-active configuration for an EVPN to a CE router, a fault based on an OAM packet forwarded from a CE router along one or more interface links associated with the CE router, wherein one of the plurality of PE routers is a designated forwarder router. The method further includes determining whether the fault is associated with the designated forwarder router. The method also includes, in response to determining that the fault is associated with the designated forwarder router, initiating a designated forwarder election.

An example network device includes a processor configured to execute an EVPN protocol to configure the network device to participate as one of a plurality of CE routers that provide an active-active configuration for an Ethernet segment coupling the CE routers to a plurality of PE routers, wherein the processor is configured to: determine whether a packet that is to be forwarded is an operations, administration, and management OAM packet; in response to determining that the packet comprises an OAM packet, replicate the OAM packet for one or more interface links of an Ethernet segment associated with the CE router; configure forwarding instructions to the one or more interface links of the Ethernet segment associated with the CE router; and forward the OAM packet and the replicated OAM packets to the PE routers.

In another example, a method includes determining, by a multi-homed CE router coupled by an intermediate network to a plurality of PE routers that provide a multi-chassis link aggregation group (MC-LAG) configuration for an EVPN, whether a packet that is to be forwarded is an OAM packet. The method further includes, in response to determining that the packet comprises an OAM packet, replicating, by the CE router, the OAM packet for one or more interface links of an Ethernet segment associated with the CE router. The method also includes configuring forwarding instructions to the one or more interface links of the Ethernet segment associated with the CE router. In addition, the method includes forwarding the OAM packet and the replicated OAM packets to the PE routers.

In another example, a computer-readable storage medium having stored thereon instructions that, when executed, cause a processor to determine whether a packet that is to be forwarded is an operations, administration, and management (OAM) packet. The instructions further cause the processor to, in response to determining that the packet comprises an OAM packet, replicate the OAM packet for one or more interface links of an Ethernet segment associated with the CE router. The instructions also cause the processor to configure forwarding instructions to the one or more interface links of the Ethernet segment associated with the CE router. In addition, the instructions further cause the processor to forward the OAM packet and the replicated OAM packets to the PE routers.

The details of one or more examples are set forth in the accompanying drawings and the description below. Other features, objects, and advantages will be apparent from the description and drawings, and from the claims.

DETAILED DESCRIPTION

Figure 1:
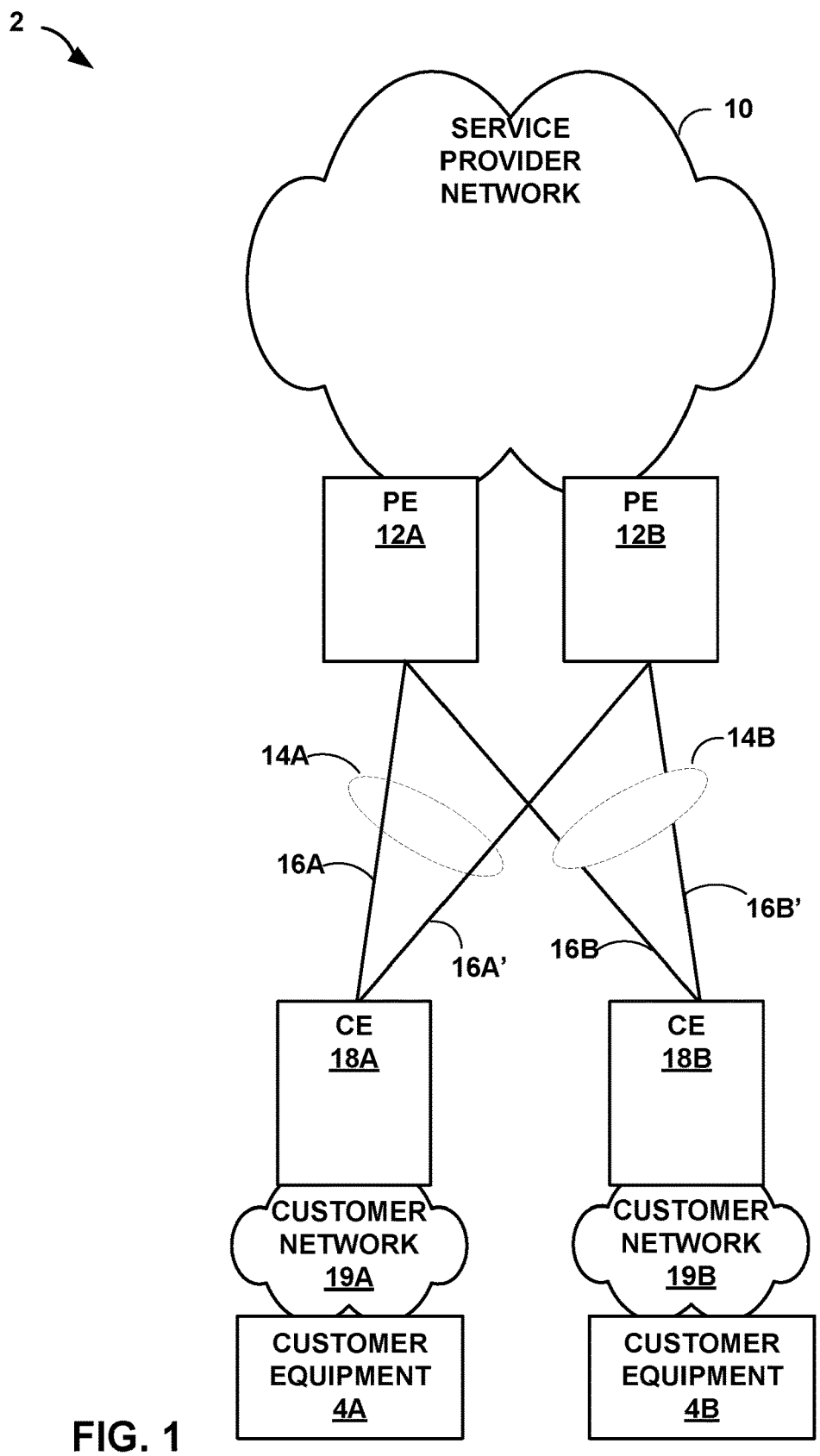
FIG. 1 is a block diagram illustrating an example network system in which a customer edge router sprays OAM traffic in accordance with the principles of the techniques of this disclosure.

FIG. 1 is a block diagram illustrating an example network system 2 in which a customer edge router sprays Operations, Administration, and Maintenance (OAM) traffic in accordance with the principles of the techniques of this disclosure.

In the example of FIG. 1, provider edge (PE) routers 12A-12B ("PE routers 12") of a service provider network 10 administered by a network service provider provide connectivity for customer networks 19A-19B ("customer networks 19"). In particular, PE routers 12 are coupled to customer edge (CE) routers 18A-18B ("CE routers 18") of customer networks 19 via links 16A, 16A', 16B, and 16B' ("access links 16"), respectively. Access links 16 may be Ethernet, asynchronous transfer mode (ATM), or any other suitable network connections.

As shown in the example of FIG. 1, service provider network 10 includes PE routers 12A-12B that are positioned at the edge of service provider network 10. PE routers 12 interface with networks, such as customer networks 19, to route, switch, or otherwise forward network traffic directed to and/or originating from the network. Customer networks 19 include CE routers 18A-18B positioned at an edge of customer networks 19A-19B, respectively. CE routers 18 interface with a network, such as service provider network 10, to route, switch or otherwise forward network traffic directed to and/or originating from the network. PE routers 12 and CE routers 18 are illustrated as routers in the example of FIG. 1. However, techniques of the disclosure may be implemented using any type of network device, including a switch, a hub, a bridge device (e.g., an Ethernet bridge), or any other suitable network devices that participate in a layer two (L2) virtual private network service, such as an Ethernet Virtual Private Network (EVPN).

Customer networks 19 may be networks for geographically separated sites of an enterprise. Each of customer networks 19 may include additional customer equipment 4A-4B ("customer equipment 4"), such as, one or more non-edge switches, routers, hubs, gateways, servers, computer terminals, laptops, databases, wireless mobile devices such as cellular phones or personal digital assistants, wireless access points, bridges, cable modems, or other network devices. Service provider network 10 may be coupled to one or more networks administered by other service providers, and may thus form part of a large-scale public network infrastructure, e.g., the Internet. Consequently, customer networks 19 may be viewed as edge networks of the Internet. The service provider may provide customer equipment 4 within customer networks 19 with access to the Internet via service provider network 10, which allows customer equipment 4 within one of customer networks 19 to communicate with customer equipment 4 within the Internet or the other one of customer networks 19. Service provider network 10 may include a variety of other network devices (not shown), such as routers, switches, servers, and the like and may be connected to other networks. The configuration of the network environment illustrated in FIG. 1 is merely exemplary. For example, service provider network 10 may include any number of provider edge routers coupled to one or more customer networks. Nonetheless, for ease of description, only customer networks 19A-19B are illustrated in FIG. 1.

Service provider network 10 represents a publicly accessible computer network that is owned and operated by a service provider, which is usually a large telecommunications entity or corporation. Service provider network 10 is usually a large layer three (L3) computer network, where reference to a layer followed by a number refers to a corresponding layer in the Open systems Interconnection (OSI) model. Service provider network 10 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 10 may be coupled to one or more networks administered by other providers, and may thus form part of a large-scale public network infrastructure, e.g., the Internet. Consequently, customer networks 19 may be viewed as edge networks of the Internet. Service provider network 10 may provide computing devices within customer networks 19 with access to the Internet, and may allow the computing devices within the computer networks to communicate with each other.

Service provider network 10 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 10 includes L2 EVPN service. For example, an EVPN is a service that provides a form of L2 connectivity across an intermediate L3 network, such as service provider network 10, to interconnect two or more L2 customer networks, such as L2 customer networks 19A and 19B, that are usually located in two different geographic areas. Often, EVPN is transparent to the customer networks 19 in that these customer networks 19 are not observant of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service."

In EVPN, administrators may configure PE routers 12 to use label switched paths (LSP) to enable a logical form of L2 connectivity. LSPs are logical network connections that emulate a connection not natively offered by service provider network 10 for consumption outside the boundaries of that service provider network 10. LSPs may emulate a L2 connection within service provider network 10 enabling service provider network 10 to offer emulated L2 connectivity externally for consumption by L2 customer networks 19 as EVPN.

In the example of FIG. 1, each of the PE routers 12 is in an active-active multi-homed connection with one or more CE routers 18. In an active-active multi-homed connection, all of the links 16 forming the multi-homed connection are considered active in that each of these links may deliver data traffic between PE routers 12 and CE routers 18 at any given time. In EVPN, a CE router is multi-homed when it is coupled to two physically different PE routers on the same EVPN instance (EVI) when the PE routers form part of the same physical Ethernet segment. As one example, CE router 18A is coupled to PE routers 12A and 12B via links 16A and 16A', respectively, where PE routers 12A and 12B are capable of providing access to EVPN for L2 customer network 19A. CE router 18A is multi-homed to PE routers 12A and 12B via separate and, to a certain extent, redundant links 16A and 16A' where both of PE routers 12A and 12B are capable of providing access to EVPN for L2 customer network 19A. Multi-homed networks are often employed by network operators to improve access to EVPN provided by service provider network 10 should a failure in one of links 16A, 16A', 16B, or 16B' occur. In active-active mode, each of PE routers 12A and 12B may also be configured as part of the same Ethernet segment (ES) and therefore have the same Ethernet segment identifier (ESI).

While CE router 18A is shown as coupling to PE router 12A via a single link 16A, CE router 18A may couple to PE router 12A via link 16A that may represent two or more links, which may be aggregated to form a link aggregation group (LAG) and therefore represent a virtual link. Likewise, any or all of links 16A', 16B, and 16B' may also couple to PE routers 12A and 12B, respectively, via two or more links, which may also be aggregated to form a LAG. The techniques should not be limited to the example shown in FIG. 1, but may be implemented with respect to any form of connectivity that involves multiple connections between two or more physical network devices, such as PE routers 12, or virtual network devices.

A LAG generally enables multiple network connections to be combined or aggregated to increase throughput and provide redundancy. Typically, a LAG enables a L2 network device to represent two or more physical connections (which are often discussed in terms of the ports to which these connections connect) as a single logical or virtual connection (which again is often referred to as a virtual port). The network device may then implement LAG, as defined for example in IEEE 802.1AX standard, in their network stack to perform switching with respect to the virtual port, including L2 learning, and other functions while the underlying LAG implementation handles of the actual packets via the physical ports. More information regarding LAG may be found in the above noted IEEE 802.1AX standard, entitled "IEEE Standard for Local and Metropolitan Area Networks—Link Aggregation," dated Nov. 3, 2008, which is hereby incorporated by reference as if fully set forth in its entirety.

In some instances, one of the PE routers 12 may be designated as a designated forwarder (DF). The designation of one router as the DF enables the DF router to forward multicast packets received on that network upstream to one or more network devices. Use of DF election ensures that only one copy of every packet will be sent to the one or more network devices. In some instances, the DF router forwards broadcast, unknown unicast, and multicast (BUM) traffic.

In operation, PE routers 12 and CE routers 18 may, to facilitate fault detection and maintenance of the connections between PE routers 12 and CE routers 18, implement operations, administration, and management (OAM) techniques, such as Connectivity Fault Management (CFM) as described in the Institute of Electrical and Electronics Engineers (IEEE) 802.1ag and International Telecommunications Union Telecommunications Standardization Sector Y.1731, entitled "OAM functions and mechanisms for Ethernet based networks," dated May 2006, standards herein incorporated by reference as if set forth in their entirety. CFM may generally enable discovery and verification of a path, through network devices and networks, taken by data units, e.g., frames or packets, addressed to and from specified network users, e.g., customer network 19. Typically, CFM is directed to fault management within layer 2 networks, such as Ethernet networks otherwise referred to as Local Area Networks (LANs), and layer 2 services.

CFM generally provides a set of protocols by which to perform fault management. One protocol of the CFM set of protocols may involve a periodic transmission of messages (e.g., Continuity Check Message (CCM)) to determine, verify or otherwise check continuity between two endpoints and may be referred to as a continuity check protocol (CCP). More information regarding CFM in general and the CFM set of protocols, including the continuity check protocol, can be found in an Institute of Electrical and Electronics Engineers (IEEE) draft standard, titled "Virtual Bridged Local Area Networks—Amendment 5: Connectivity Fault Management," by the LAN MAN Standards Committee, dated Dec. 17, 2007, herein incorporated by reference in its entirety. In accordance with the techniques described in this disclosure, each of the CE routers 18 may communicate OAM packets, such as to determine the status of connections to the PE routers 12, and may replicate the OAM packets so as to transmit the replicated OAM packets across all links for each of Ethernet segments 14. As there may be many aggregated links of the logical interfaces on the same physical interface but part of different routing-instances, the transmission of replicated OAM packets to all links of each Ethernet segment ensures monitoring at the service/logical-interface level for all links associated with CE routers 18.

For example, links 16A and 16A' from CE router 18A may establish an Ethernet segment 14A to PE routers 12A and 12B, and may each be an aggregated bundle of links (forming respective LAGs). Likewise, links 16B and 16B' from CE router 18B may establish an Ethernet segment 14B to PE routers 12A and 12B. PE router 12A may associate two Ethernet segments (ES), such as ES 14A and ES 14B, with the same logical interface of PE router 12A. If each link is aggregated and is part of different routing instances, monitoring from the PE port level is inadequate for OAM techniques due to the transmission and reception of packets from only one of the aggregated physical links of the CE routers 18. More specifically, for example, multiple services may pass through the user network interface (UNI) to one of the CE router ports via multiple service/logical interfaces, which in turn may be transmitted to the same physical PE router port through the network to network interface (NNI). In accordance with the techniques described herein, each of the CE routers 18 may be configured to determine the existence of OAM packets for forwarding, replicate the OAM packets, and modify the forwarding plane to forward the replicated OAM packets to all links for each Ethernet segment so as to monitor active connections or detect the existence of failures at the service/logical interface level for each link.

In one instance, fault detection at the service/logical-interface level for each link may further enable election of a new designated forwarder (DF) router for forwarding broadcast, unknown unicast, and multicast (BUM) traffic upon a detection of a failure at a link. For example, PE router 12A may be designated as the DF to forward BUM traffic to the CE routers 18. However, due to a failure at link 16A, PE router 12A is unable to forward the BUM traffic to CE router 18A. CE router 18A may spray a replicated Continuity Check Message (CCM) (e.g., where the router detects whether a transmitted message is received within a threshold time interval) to detect the failure along links 16A and 16A'. Spraying OAM packets on links 16A and 16A' ensures that all routers within an Ethernet segment, such as PE routers 12A and 12B, are notified of the existence of a failure on link 16A, therefore enabling the PE routers 12 to notify a Routing Protocol Process (RPD) of the failure, which may trigger a new DF election process. Notification of an Ethernet segment failure to the EVPN may include withdrawing a designated Ethernet segment (ES) route, an administrative distance (AD) router per Ethernet segment identifier (ESI), and an AD router per Ethernet segment identifier per EVPN instance (EVI). Notification of a failure recovery (e.g., when session returns and Ethernet segment is up) to the EVPN may include advertising an ES route, an AD route per ESI, and an AD router per ESI per EVI. Notification of a core isolation failure to the EVPN may include sending an interface status command in CCM to bring the CE router logical interface down and to trigger a mac-flush, and send a remote defect indication (RDI) to bring down the CE router logical interface and trigger a mac-flush. Notification of a failure recovery (e.g., PE router joins back in the network) to the EVPN may include sending an interface status command in CCM to bring the CE router logical interface up and to trigger a mac-flush, and clear the RDI to bring up the CE router logical interface.

The techniques described herein can be applied in each of the CE routers 18 for a number of different situations in which forwarding structures are configured for particular packet forwarding operations by hardware or software modules, or combination thereof (e.g., processes, daemons, or other modules) running on a higher-level control plane of the network device, such as CE routers 18. Configuration of each of the CE routers 18 may be initiated with a command line interface (CLI) command, e.g., set interfaces ae22 aggregated-ether-options send-to-all-members, to spray OAM packet frames across all links of an aggregated Ethernet port. For example, the CLI commands "set" may be a command entered for each of the CE routers 18; "interfaces" may be a keyword referring to a group of interfaces defined in the configuration file; "ae 22" may be a particular interface defined in the configuration file; "aggregated-ether-options" is a keyword referring to a set of options available for any Ethernet segment; and "send-to-all-members" is a keyword that enables the option to spray the OAM packet to all member links.

Entering the above CLI command will initiate a configuration of forwarding operations for one or more of the CE routers 18. For example, the forwarding structures are pushed down to (i.e., installed within) a forwarding plane of each of the CE routers 18 for forwarding packets including packet frames under operations, administration, and management (OAM) protocol. Several such example forwarding operations are described below to illustrate the techniques of the disclosure. Specifically, one example described below is the configuration of next hops in the context of next hop chaining while forwarding packets. Yet another example described below is the configuration of multicast next hops for multicasting. However, the techniques of the disclosure are not limited to these particular examples. The techniques of the disclosure are applicable to any situation in which forwarding structures are pushed down from the control plane to and installed within forwarding hardware of the forwarding plane of each of the CE routers 18, regardless of whether the forwarding structures are forwarding next hops, interfaces, or other forwarding structures. For example, the techniques may also apply to automatically sensing some condition at the time packets are received, and based on the sensed condition, forming the interfaces on which to output replicated OAM packets. The techniques may therefore be applicable to any CE router that sprays OAM packets.

As one example, a forwarding structure control module executing within a kernel of the control plane of each of CE routers 18 may be configured with data specifying the different types of forwarding hardware components installed (e.g., chipset type) within the forwarding plane of each of the CE routers 18. Based on this information, the forwarding structure control module provides different information to the forwarding components depending on the chipset type and the chipsets native support for different forwarding operations. Examples of providing different information to forwarding components based on first, second, or third generation chipsets are described in U.S. Pat. No. 7,990,993, entitled "PLATFORM-INDEPENDENT CONTROL PLANE AND LOWER-LEVEL DERIVATION OF FORWARDING STRUCTURES," the contents of which is incorporated herein by reference.

In this case, any of CE routers 18 having forwarding hardware based on "first-generation chipsets" (e.g., chipsets that do not support flooding next hop identifiers) are configured with a lower-level component referred to herein as a forwarding structure control module. The forwarding structure control module operates at a lower-level of the control plane for each of CE routers 18 and configures the "OAM flooding next hops" from the flooding next hop identifiers on behalf of the high-level, control plane software. For example, the lower-level forwarding structure control module of CE router 18A derives the particular next hops by first performing flood list expansion to logically expand the flooding next hop identifiers maintained by the high-level control plane software into the complete list of next hops within the L2 network. For example, with respect to forwarding OAM packet frames from CE router 18A, the forwarding structure control module may expand a flooding next hop identifier FNH1 to the set of actual next hops {NH1 and NH2} representing neighboring devices PE 12A and PE 12B. In other words, forwarding structure control module may expand a flooding next hop identifier to next hops representing devices within the same Ethernet segment of the CE router.

Continuing the example from above, if the system determines that OAM packets are to be forwarded, the lower-level forwarding structure control module modifies the forwarding information produced by the upper-level, control plane software to replace the flooding next hop identifier FNH1 within the forwarding information with a set of specific next hops {NH1 and NH2}. Alternatively, the forwarding structure control module may modify the forwarding information to replace the flooding next hop identifier FNH1 within the forwarding information with a different identifier, i.e., a OAM packet flooding next hop identifier, that indexes data specifying the set of specific next hops {NH1 and NH2}.

As described in further detail below, a one-to-one relationship may exist between the interfaces and the next hops, even in the case that the L2 router includes a plurality of packet forwarding engines, and the lower-level components responsible for OAM packet flooding next hops map the interfaces to next hops according to an index. Based on this information, the lower-level forwarding structure control module may configure OAM packet flooding next hops to which to forward OAM packet frames for each interface associated with a given packet forwarding component of the device. For example, the lower-level forwarding structure control module may determine which next hop corresponds to each interface based on this one-to-one relationship. The forwarding structure control module then configures the complete list of OAM packet flooding next hops for each interface.

For example, if interfaces I1 and I2 of CE router 18A correspond to next hops PE 12A and PE 12B, respectively, the end result of the configured OAM packet flooding next hops may be the following routes:

$$\begin{cases} I_1 \rightarrow FNH_1 \rightarrow \{PE12A, PE12B\} \\ I_1 \rightarrow FNH_2 \rightarrow \{PE12B, PE12A\} \end{cases}$$

where FNH1-FNH2 are flooding next hop identifiers used in forwarding information in association with interfaces based on an index, and where each configured set { . . . } contains the list of specific next hops to which to flood OAM packet on that interface.

The lower-level forwarding structure control module of each of the CE routers 18 selectively updates the forwarding information to map each of the interfaces to the respective configured OAM packet flooding next hops, and the updated forwarding information is then installed within the appropriate hardware components of the packet forwarding engine(s) of the CE router.

Figure 2:
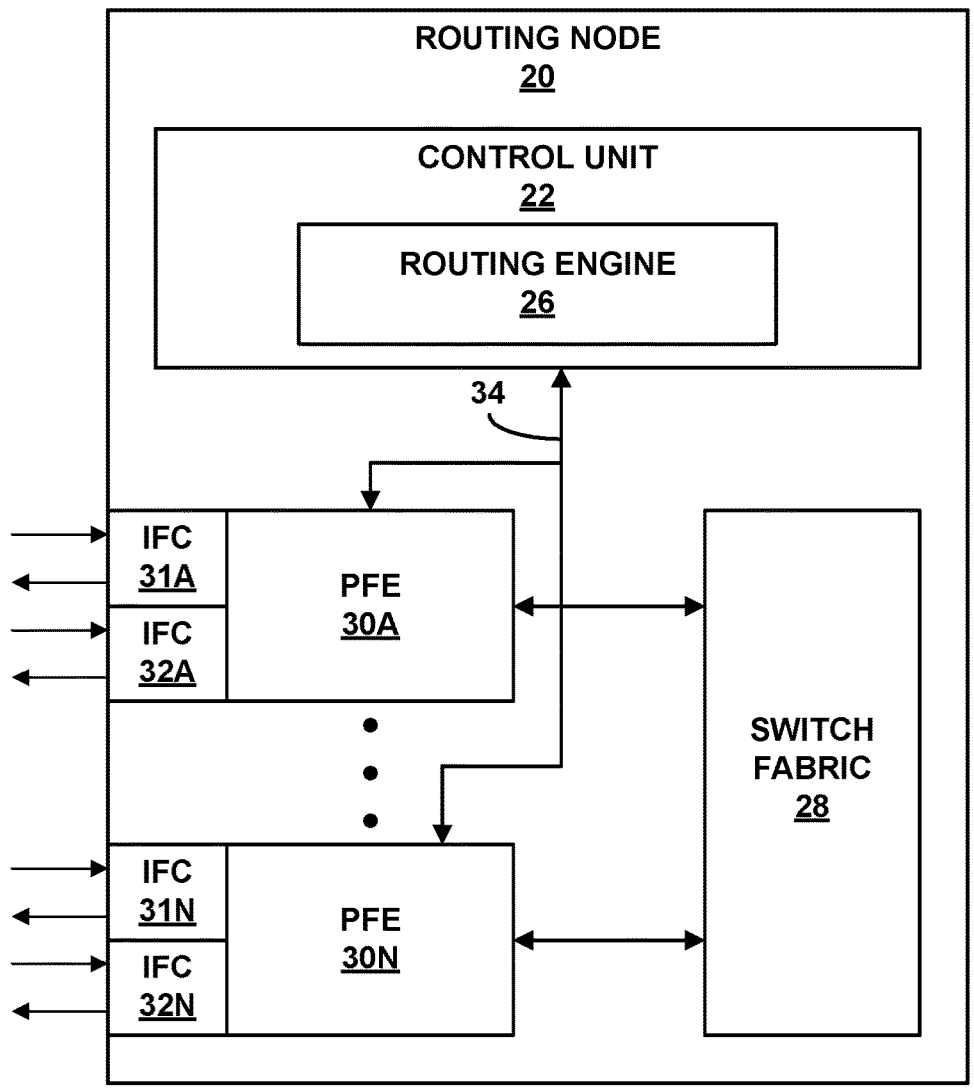
FIG. 2 is a block diagram illustrating an example routing node that creates forwarding structures to be installed in a forwarding plane in accordance with the principles of the techniques of this disclosure.

FIG. 2 is a block diagram illustrating an example routing node 20 that creates forwarding structures to be installed in a forwarding plane in accordance with the principles described herein. Routing node 20 may comprise a router such as one of CE routers 18 of FIG. 1. In this example, routing node 20 includes a control unit 22 that includes a routing engine 26 that provides control plane functionality for the device. Routing node 20 also includes a plurality of packet forwarding engines 30A-30N ("PFEs 30") and a switch fabric 28 that collectively provide a data plane for forwarding network traffic. PFEs 30 receive and send data packets via interface cards 31A-31N ("IFCs 31") and IFCs 32A-32N ("IFCs 32"). In other examples, each of PFEs 30 may comprise more or fewer IFCs. Although not shown, PFEs 30 may each comprise a central processing unit (CPU) and a memory. Switch fabric 28 provides a high-speed interconnect for forwarding OAM packet frames to the correct one of PFEs 30 for transmission over a network.

Routing engine 26 provides control plane functions storing network topology in the form of routing tables, executing routing protocols to communicate with peer routing devices, and maintaining and update the routing tables. Routing engine 26 also provides a management interface to allow user access and configuration of routing node 20.

Routing engine 26 is connected to each of PFEs 30 by a dedicated internal communication link 34. For example, dedicated link 34 may comprise a 200 Mbps Ethernet connection. Routing engine 26 maintains routing information that describes a topology of a network, and derives a forwarding information base (FIB) in accordance with the routing information. In general, the routing information represents the overall topology of the network and defines routes to destinations/prefixes within the network. In contrast, the forwarding information is generated based on selection of certain routes within the network and maps packet key information (e.g., destination information and other select information from a packet header) to one or more specific next hops and ultimately to one or more specific output interfaces of IFCs 31, 32. Routing engine 26 may install forwarding information from the FIB into each of PFEs 30 to control forwarding of traffic within the data plane. This allows the FIB in each of PFEs 30 to be updated without degrading packet forwarding performance of routing node 20.

Based on the stored FIBs, PFEs 30 flood copies of each OAM packet frame to a plurality of next hops associated with the same layer two (L2) network as the interface on which a CE router 18 is connected.

Routing node 20 may have one or more packet forwarding engines 30 or other hardware components that are not configured for OAM packet flooding. In this case, the packet forwarding engine does not recognize flooding next hop identifiers and must be configured by control unit 22 with forwarding information that maps an ingress port to a specific plurality of next hops in the service provider network 10 to which to flood the OAM packet. For example, PFE 30A may comprise a first generation chipset that requires that the FIB installed by control unit 22 to specify a plurality of next hops to which to flood copies of OAM packets, because it is not capable of configuring the plurality of next hops to which to flood the copies of the OAM packets from a single flooding next hop identifier.

Nevertheless, the high-level control plane software executing within routing engine 26 utilizes the logical construct of a flooding next hop identifier when generating the FIB. A forwarding structure control module operative below the high-level control plane software performs flood list expansion as well as generation and installation of forwarding information in the necessary format to specify all individual next hops to which to flood OAM packet frames.

A one-to-one relationship may exist between the interfaces of IFCs 31, 32 and the elemental unicast next hops within the L2 network, and the forwarding structure control module responsible for configuration of the OAM packet flooding next hops maps the interfaces to next hops according to an index. The lower-level forwarding structure control module determines which next hop corresponds to each interface based on this one-to-one relationship. The forwarding structure control module then configures the complete list of OAM packet flooding next hops for each ingress interface by adding the next hop that corresponds to each ingress interface from a set of all next hops associated with the domain. The lower-level forwarding structure control module of routing engine 26 selectively updates the forwarding information to map each of the interfaces to the respective configured OAM packet flooding next hops, and the updated forwarding information is then installed within the appropriate packet forwarding engine 30.

In another example, each PFEs 30 of the L2-enabled device, such as each of the CE routers 18, is configured with a 'slave' forwarding structure control module to internally configure OAM packet flooding next hops based on next hop information provided by the 'master' forwarding structure control module executing with control unit 22. In this example, the 'slave' forwarding structure control module of the forwarding components may follow a similar method for configuring the OAM packet flooding next hops using the one-to-one correspondence between the interfaces and next hops to add the next hop that corresponds to each ingress interface from a set of all next hops within the domain.

In other examples, PFEs 30 may have second- or third-generation chipsets that may not require that the forwarding information specify the plurality of next hops to which to flood copies of the OAM packet. Rather, the second- or third-generation chipsets may be capable of determining the plurality of next hops to which to flood the copies of the OAM packet "on-the-fly" from a single flooding next hop that represents all of the next hops within the L2 network. For example, the second- or third-generation chipsets may identify the ingress interface of a packet, on-the-fly prior to flooding the OAM packet, and add the next hop associated with each interface from the set of next hops associated with the domain.

Thus, different PFE chipsets within CE router 18A may apply different techniques for OAM packet flooding. The forwarding structure control module executing within routing engine 26 may be configured with data specifying the type of chipset for each of PFEs 30. As a result, the forwarding structure control module may provide forwarding information in different formats to the PFEs 30 depending on the chipset type. This allows each of PFEs 30 to obtain OAM packet flooding next hops according to its own functionality for use in OAM packet forwarding. In this manner, high-level software protocols (not shown) running above the operating system within control unit 22 may be unaware of the different flooding techniques being used at the packet forwarding level. This allows high-level control plane software executing on within the L2-enabled routing node 20 (such as L2/L3 routing protocols) to utilize flooding next hop identifiers to more easily maintain network topology information and forwarding information. With the same abstraction being seamlessly presented to the high-level control plane software in this manner, it may be easier to program the high-level control plane software with respect to this consistent abstraction. These techniques may allow for better scaling when interfaces fail, join, or leave the EVPN domain.

Control unit 22 may be implemented solely in software, hardware, firmware or as a combination. For example, control unit 22 may include one or more processors that execute software instructions. In that case, the various software modules of control unit 22 may comprise executable instructions stored on a computer-readable storage medium, such as computer memory or hard disk.

Figure 3A:
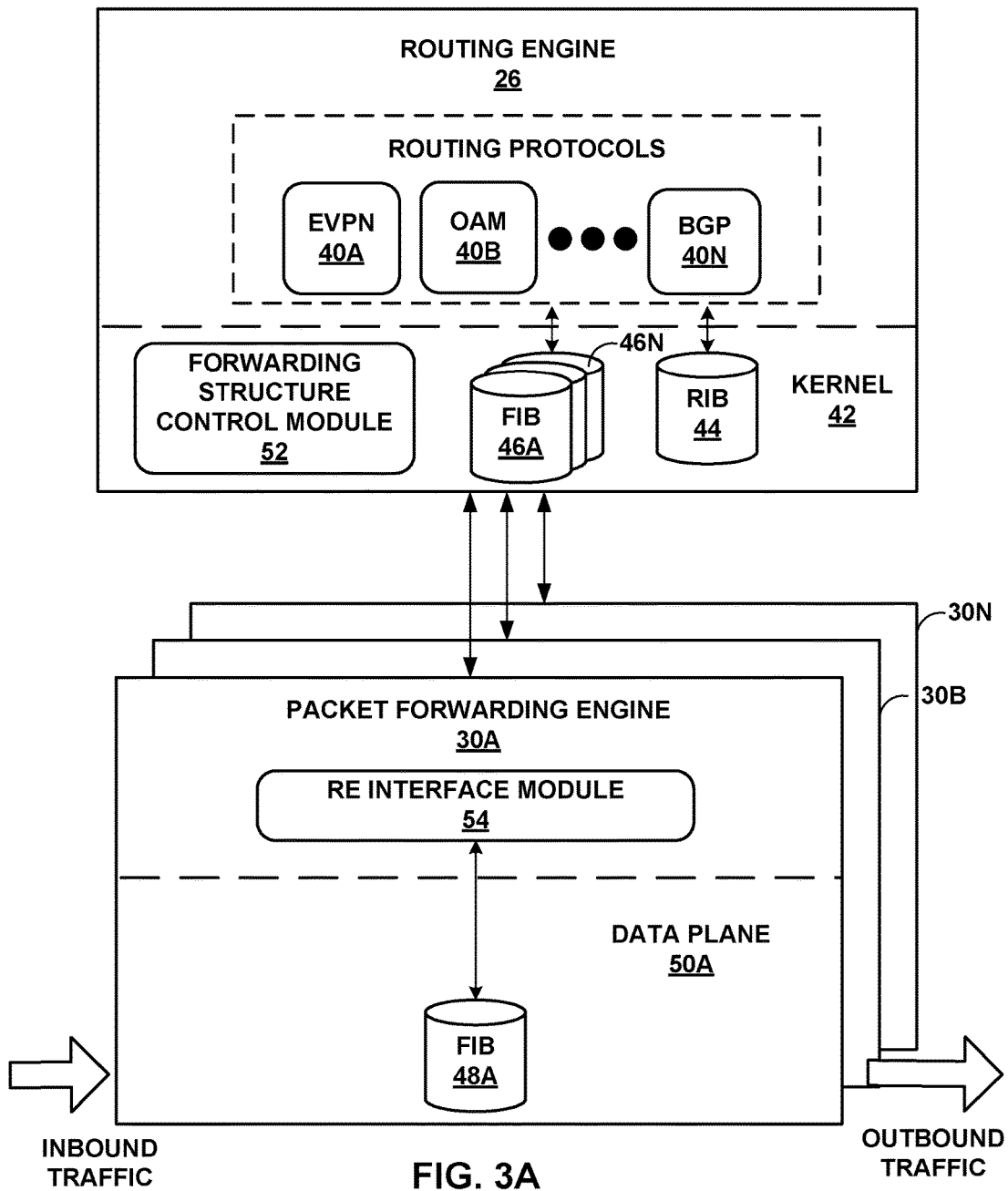
FIGS. 3A-3B are block diagrams illustrating a routing engine and a packet forwarding engine of the routing node of FIG. 2 in further detail.
Figure 3B:
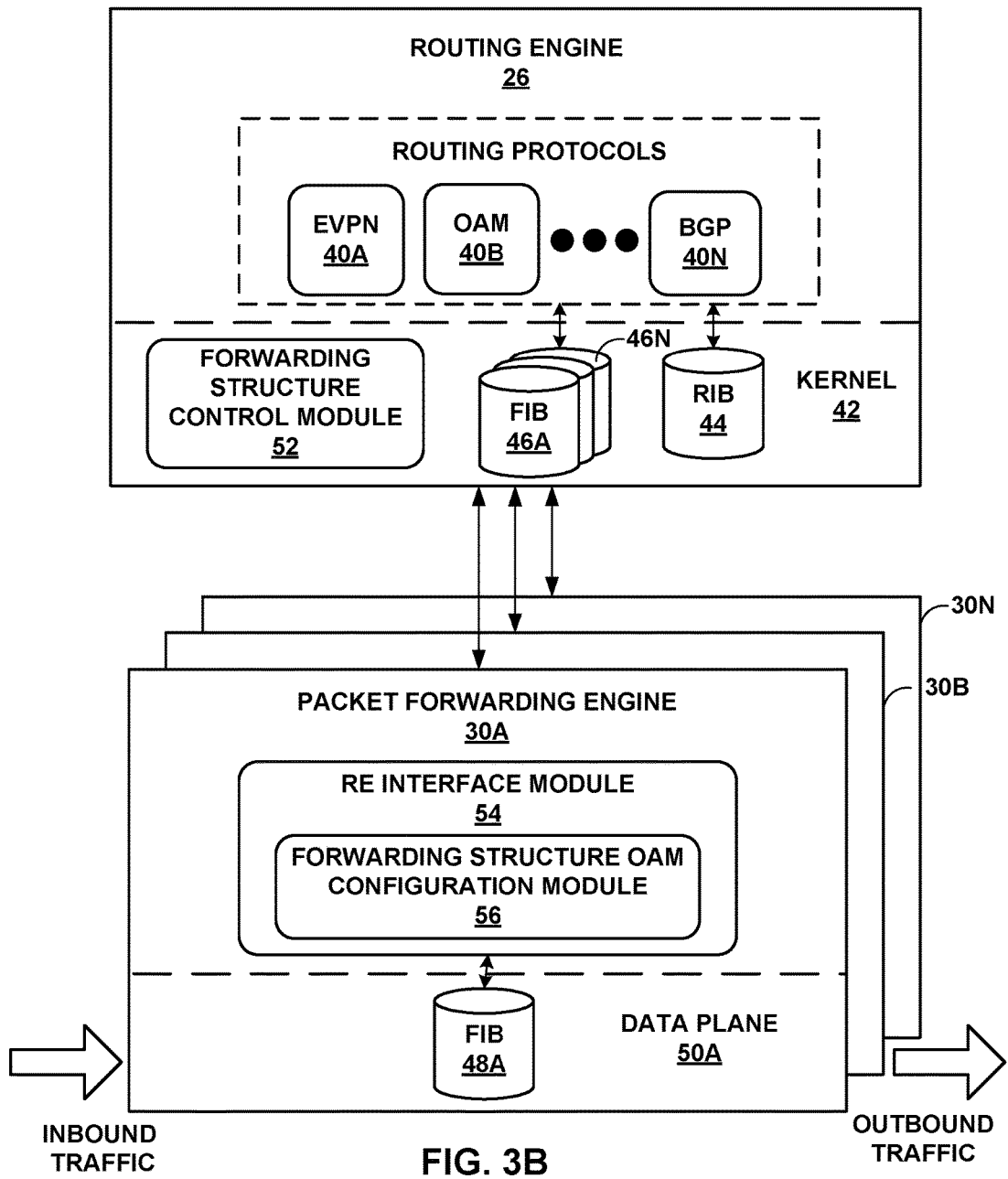

FIGS. 3A-3B are block diagrams illustrating routing engine 26 and packet forwarding engine 30A of routing node 10 of FIG. 2 in further detail. Routing engine 26 includes high-level, control plane routing protocols 40A-40N ("routing protocols 40"). In the example of FIGS. 3A and 3B, routing protocols 40 include EVPN 40A, OAM 40B and BGP 40N. Routing engine 26 may include other routing protocols not shown in FIGS. 3A and 3B. Routing protocols 40 interact with kernel 42 to update routing information base (RIB) 44 based on routing protocol messages received by routing node 20. In response, kernel 42 generates forwarding information in the form of FIBs 46A-46N based on the network topology represented in RIB 44. Kernel 42 then programs PFEs 30 to install copies of the FIBs as FIBs 48A-48N within their respective data plane 50, i.e., packet forwarding components having specialized forwarding chipsets.

As described above, PFE 30A may comprise a first-generation chipset that requires that installed forwarding information specify the particular plurality of next hops to which to flood copies of OAM packets. In this case, routing engine 26 programs PFE 30A to store FIB 48A. FIB 48A includes forwarding information describing interfaces and corresponding next hops to which OAM packets should be forwarded on the interfaces.

When invoked, forwarding structure control module 52 processes the forwarding information within FIBs 46 to replace the flooding next hop identifiers as necessary. For example, for each flooding next hop, the forwarding structure control module 52 may first determine the next hop that corresponds to the respective input interface using an index assignment based on the one-to-one relationship between elemental unicast next hops (as opposed to flooding next hops) and interfaces. For example, the one-to-one relationship may be as follows:

$$\begin{cases} I_1, & N_1 \\ I_2, & N_2 \end{cases}$$

where $N_1$ and $N_2$ may represent the next hops to PE routers 12A and 12B, respectively. Thus, there is a duality between interfaces and next hops in that what is modeled as an interface on packet ingress is modeled as a next hop on packet egress. In other words, each interface $I_i$ denotes an ingress port for which $N_i$ is the corresponding egress port.

Forwarding structure control module 52 may then insert the complete list of next hops for which to flood OAM packet for each ingress interface. Alternatively, forwarding structure control module 52 may produce additional forwarding information storing the derived list of OAM packet flooding next hops and replace the flooding next hop label with a new label NF1-NF2 mapped to the respective list OAM packet flooding next hops:

$$\begin{cases} I_1 \to \{N_1, N_2\} = N_{F1} \\ I_1 \to \{N_2, N_1\} = N_{F2} \end{cases}$$

Forwarding structure control module 52 then updates FIBs 46 as necessary based on the capabilities of the underlying PFEs 30, i.e., their ability to support flooding next hop identifiers. Kernel 42 then installs FIBs 48 to PFEs 30. In this manner, routing protocols 40 need not maintain the routing information of RIB 44 to expressly generate and store all of the routes to which to flood OAM packet frames.

In other examples, the packet forwarding functionality may be distributed among interface cards (IFCs) 31 and 32 (FIG. 2). In this case, routing engine 26 may similarly perform the OAM packet flooding next hop determination, and provide the flooding next hops to packet forwarding components in each of IFCs 31, 32.

In some examples, routing node 20 may additionally include second- or third-generation packet forwarding engine technology. For example, one or more of PFEs 30 may comprise PFE chipsets capable of identifying the interface, from which a packet ingressed, on-the-fly prior to flooding the OAM packet, and adding the next hop of each interface from the set of next hops associated with the domain. Thus, different PFEs 30 of routing node 20 may apply different techniques for OAM packet flooding.

Forwarding structure control module 52 of routing engine 26 may provide FIBs 48A-48N that are tailored to the requirements of respective PFEs 30A-30N. For example, where PFE 30A is a first-generation chipset and PFE 30N is a third-generation chipset, routing engine 26 may generate FIB 48A differently than FIB 48N according to the specific OAM packet next hop functionality of the FIBs 48. The techniques of this disclosure may allow routing node 20 to present a unified, seamless abstraction of OAM packet flooding such that routing protocols 40 are unaware of the different flooding techniques being used at the packet forwarding level. This may be easier to program to, and may allow for better scaling when interfaces fail, join, or leave the EVPN domain.

An alternative example in which PFE 30A internally determines the OAM packet flooding next hops will now be described with respect to FIG. 3B. Forwarding structure derivation module 54 of PFE 30A may operate as a 'slave' forwarding structure control module based on information provided by the 'master' forwarding structure control module 52 of routing engine 26. Forwarding structure OAM configuration module 56 of PFE 30A may obtain routes and next hops from forwarding structure control module 52 of routing engine 26, e.g., via FIB 46A. For example, forwarding structure OAM configuration module 56 may obtain the following routes and next hop information from FIB 46A:

$$\begin{cases} I_1 \to FNH\{SH\} \\ I_2 \to FNH\{SH\} \end{cases} \text{ and } FNH = \{N_1, N_2\},$$

where $I_1$-$I_2$ are interfaces of PFE 30A having indices 1-2, and where FNH is a flooding next hop that represents the set of $N_1$-$N_2$ individual distinct next hops, and where {SH} is a next hop action identifier that specifies the requirement that the next-hops should conform to spraying the OAM packet. Alternatively, the information obtained from FIB 46A may be expressed as follows:

TABLE 1

| Routes | NHs | NH Action Identifier |
|---|---|---|
| {I₁, I₂} | {FNH} | {SH} | depending on the details of the implementation.

In one example, forwarding structure OAM configuration module 56 of PFE 30A is able to derive the set of OAM packet flooding next hops for each of interfaces I1-I2 based on ingress interface information received from forwarding structure control module 52 of routing engine 26.

Forwarding structure OAM configuration module 56 then derives an OAM packet flooding next hop for each interface by adding the next hop that corresponds to all ingress interfaces from the set of next hops of NF. Forwarding structure OAM configuration module 56 may update FIB 48A as necessary to store the configured OAM packet next hop for each interface. Each of PFEs 30 that comprises a first-generation chipset may include a corresponding 'slave' forwarding structure OAM configuration module 56 that receives information from 'master' forwarding structure control module 52 and operates accordingly to internally derive OAM packet flooding next hops for the respective ones of PFEs 30. In addition, forwarding structure control module 52 may generate FIBs 48 differently depending on the type of chipset included within PFE 30.

Forwarding structure OAM configuration module 56 may obtain indices for the new OAM packet flooding next hops. The indices of the new OAM packet flooding next hops are consistent across all of PFEs 30. This may be achieved in a variety of ways. Each of the PFEs 30 can follow the process described above to generate the same forwarding lists, but the PFEs 30 need to agree on the next hop indices NFn assigned to the lists. As one example, forwarding structure OAM configuration module 56 within one of PFEs 30 may do an upcall to forwarding structure control module 52 within kernel 42 of routing engine 26 to request that an index be assigned for one or more configured OAM packet flooding next hop lists (e.g., {N1, N2}). When forwarding structure control module 52 receives such a request for a OAM packet flooding next hop list for the first time, forwarding structure control module 52 allocates an index and forms a cache of the corresponding mapping of list to index. When any other PFE 30 asks for an index for OAM packet flooding next hop list for which an entry is already present in the cache (i.e., another PFE 30 has already asked for an index for that list), forwarding structure control module 52 refers to the cache and returns the index for that OAM packet flooding next hop list according to the mapping. In this manner, when forwarding structure control module 52 has seen the same OAM packet flooding next hop before, forwarding structure control module 52 assigns the same index as was assigned before. If forwarding structure control module 52 has not seen the OAM packet flooding next hop before, forwarding structure control module 52 assigns a new index. This ensures that all of PFEs 30 have the same value for the next hop indices for OAM packet flooding.

After the OAM packet flooding next hops are determined and assigned indices, RE interface module 54 may provide the new OAM packet flooding next hops to forwarding structure control module 52 of routing engine 26. Forwarding structure control module 52 updates the routes within RIB 44 and generates new FIBs 46. The updated routes map each of the interfaces to the respective determined OAM packet flooding next hop, which associates all of the interfaces with the same flooding next hop. Forwarding structure control module 52 installs FIBs 48 to PFEs 30 in accordance with FIBs 46.

As another example, the determination of OAM packet flooding next hop described above may be performed by forwarding structure control module 52 in kernel 42 of routing engine 26. Since routing engine 26 is a central node with respect to each of PFEs 30, forwarding structure control module 52 of routing engine 26 may keep track of which indices are provided for each flooding next hop.

Figure 4A:
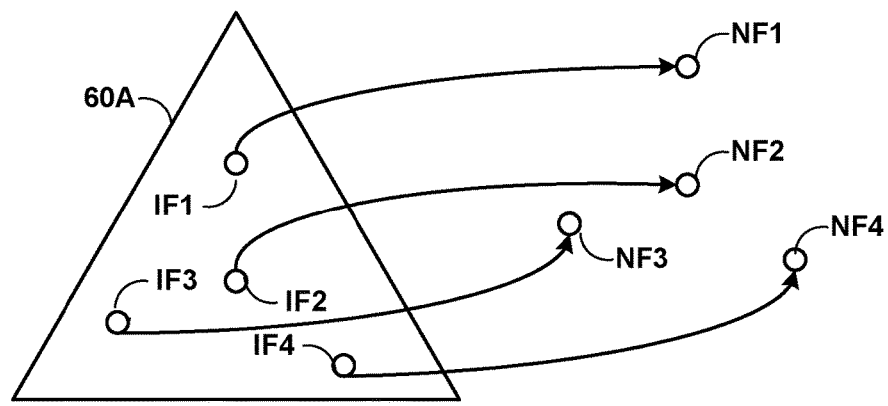
FIGS. 4A-4B are block diagrams illustrating forwarding information bases (FIBs) maintained by packet forwarding engines in the form of radix trees.
Figure 4B:
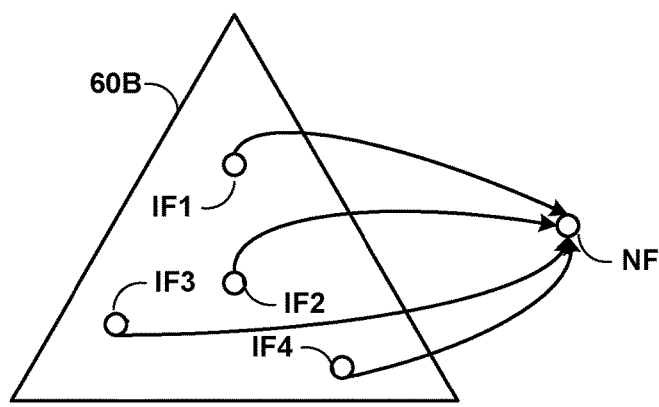

FIGS. 4A-4B are block diagrams illustrating example forwarding information bases (FIBs) 60A and 60B maintained by PFEs 30 in the form of radix trees. FIB 60A of FIG. 4A is a representation of a FIB that may be generated and installed within a PFE having a first-generation chipset (e.g., PFE 30A), and FIB 60B is a representation of a FIB that may generated and installed within in a second- or third-generation chipset (e.g., PFE 30N). FIBs 60A-60B includes forwarding information for each interface of PFEs 30A and 30N by identifying next hop(s) to which an OAM packet should be forwarded on the interface. For example, nodes of the radix tree of FIB 60A have been generated to include data specifying OAM packet flooding next hop identifiers NF1-NF4:

$$\begin{cases} I_1 \rightarrow NF1 \\ I_2 \rightarrow NF2 \end{cases}$$

where NF1-NF2 correspond to OAM packet flooding next hop forwarding lists as described above (e.g., {N1, N2}).

In addition, FIB. 60A has been generated to include data external to the radix tree that stores the specific next hops to which to flood OAM packets. That is, the pointer for the node associated for the first interface I1 includes the OAM packet flooding next hop identifier NF1, which points to a data set specifying next hops {NH1 and NH2}. In this manner, the forwarding information of FIB 60A includes all information for OAM packet flooding without placing any burden on the PFE for on-the-fly determination.

In contrast, FIB 60B utilizes flooding next hop identifiers. In this case, the nodes of the radix tree corresponding to all interfaces I1-I2 include a single flooding next hop identifier FNH to logically represent that OAM packet frames for those interfaces are to be flooded on the corresponding L2 network:

$$\begin{cases} I_1 \rightarrow FNH \\ I_2 \rightarrow FNH \end{cases}$$

Thus, FIB 60B may utilize fewer identifiers and occupy less memory resources. Moreover, the routing protocols and other higher-level software of the routing engine need not be configured to handle the complexities of generating the routing and forwarding information in compliance with the OAM protocol. When forwarding traffic, the PFE using second-generation chipsets processes FIB 60B on-the-fly to (i.e., at the time of forwarding traffic) to derive the specific next hops to which to flood the OAM traffic.

Figure 5:
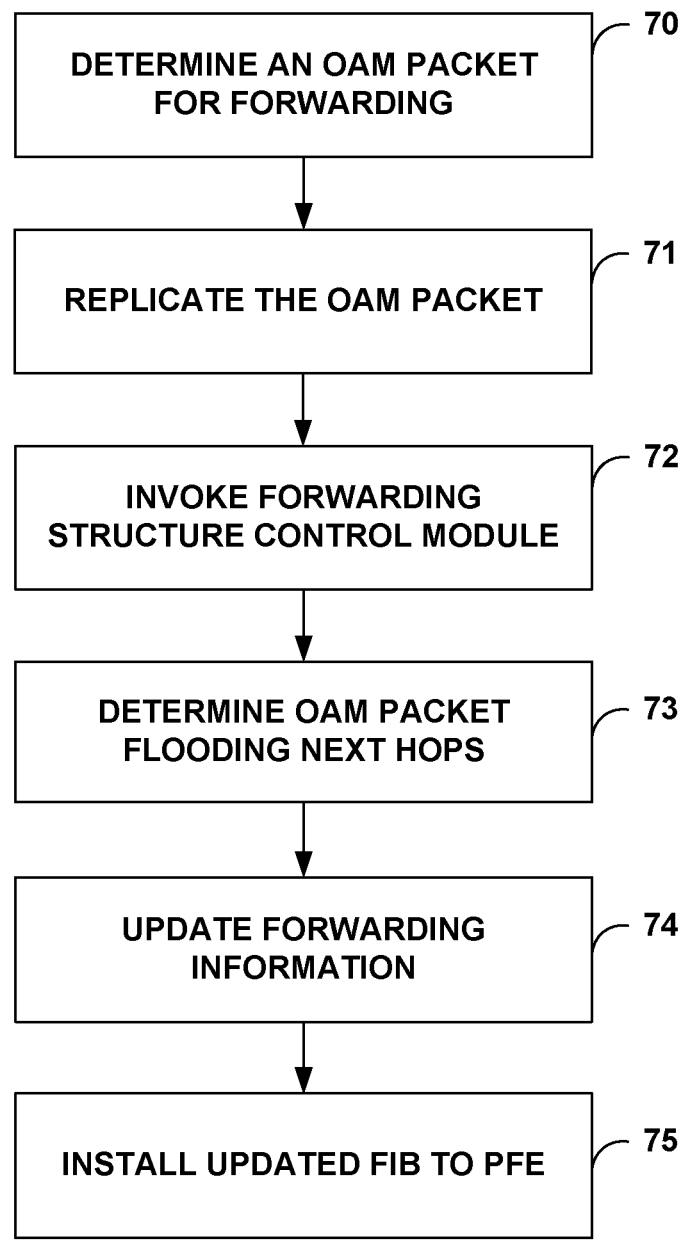
FIG. 5 is a flowchart illustrating an example OAM packet forwarding operation and example operation of the routing node.

FIG. 5 is a flowchart illustrating an example OAM packet forwarding operation and example operation of PFE 30A and routing engine 26 of routing node 20. For purposes of example, FIG. 5 will be described with respect to the example in which the determination of OAM packet hops is performed at the control plane of routing engine 26. In this example, after configuration of the command line interface for one of the CE routers 18, such as CE router 18A, the configured CE router may initiate the OAM packet forwarding process by determining that the forwarding packet is an OAM packet (70). For example, Connectivity Fault Management (CFM) frames in accordance with the OAM protocol may include packet frames based on a particular EtherType value (0x8902) or dMAC address standardized by Institute of Electrical and Electronics Engineers (IEEE) 802.1ag and International Telecommunication Union-Telecommunication Standardization Sector (ITU-T) Y.1731 standards, herein incorporated by reference in their entirety. Each of the CE routers 18 may first determine a forwarding packet's EtherType value or dMAC address. If the EtherType value or dMAC address matches the standard as defined in IEEE 802.1ag or ITU-T Y.1731, an OAM packet is determined and the OAM packet forwarding process is initiated.

In response to determining an OAM packet for forwarding, the OAM packet frame is replicated in preparation for forwarding the replicated OAM packet to all links associated with the CE router (71). For example, upon recognizing the forwarding packet is in accordance with the OAM protocol, routing node 20 may replicate the OAM packet for forwarding.

After route resolution and prior to installation of forwarding information within the underlying PFEs, kernel 42 seamlessly invokes forwarding structure control module 52 to process and modify FIB 46A based on the capabilities of PFE 30A (72). As discussed, a one-to-one relationship exists between the interfaces and the elemental unicast next hops. Based on this information, forwarding structure control module 52 of routing engine 26 processes the forwarding information to identify any use of flooding next hop identifiers, performs flood list expansion to logically expand the flooding next hop identifiers maintained by the high-level control plane software into the complete list of next hops within the L2 network, and determines the particular OAM packet flooding next hops to add a next hop associated with the input interface (73). For example, forwarding structure control module 52 determines a next hop that corresponds to each interface based on the one-to-one relationship. Forwarding structure control module 52 then determines an OAM packet flooding next hop for each interface by adding the next hop that corresponds to each ingress interface from the set of next hops of the flooding next hop identifier associated with the domain.

Forwarding structure control module 52 may then modify the forwarding information to replace the flooding next hop identifier with the full, determined list of OAM packet next hops (74). Alternatively, forwarding structure control module 52 may modify the forwarding information to replace each flooding next hop identifier with a corresponding OAM packet flooding next hop identifier that indexes a list of the particular OAM packet next hops stored external to the radix tree. Forwarding structure control module 52 then communicates FIBs 48 to RE interface module 54 for installation within the respective data plane 50 of PFEs 30 (75).

As another example, the techniques described herein may also apply to derivation of multicast next hops. Referring to FIG. 1, in some examples, system 2 may be used to distribute multicast communications of OAM packets. For example, service provider network 10 may provide multicast services to allow CE router 18A to multicast OAM packets to PE routers 12. Referring to FIG. 3, routing protocols 40 may also include multicast protocols, such as Protocol Independent Multicast (PIM), Internet Group Management Protocol (IGMP), or other protocol for use in multicast communication.

PFEs 30A-30N and switch fabric 28 of routing node 20 may have different capabilities and limitations with regard to multicast communication, depending on the underlying forwarding hardware architecture. For example, some routing nodes 20 may not have a switch fabric 28, while other routing nodes 20 may have a switch fabric 28 as shown in FIG. 2. In accordance with the principles of the disclosure, in some aspects, forwarding structure control module 52 is aware of the underlying architecture of routing node 20 in this regard, and provides multicast distribution trees to each of PFEs 30 that are tailored to the requirements of the forwarding plane architecture of routing node 20. In another aspect, PFEs 30 are themselves aware of requirements of the forwarding plane architecture, and make requests (e.g., upcalls) to forwarding structure control module 52 to obtain one or more appropriate multicast distribution trees.

Figure 6:
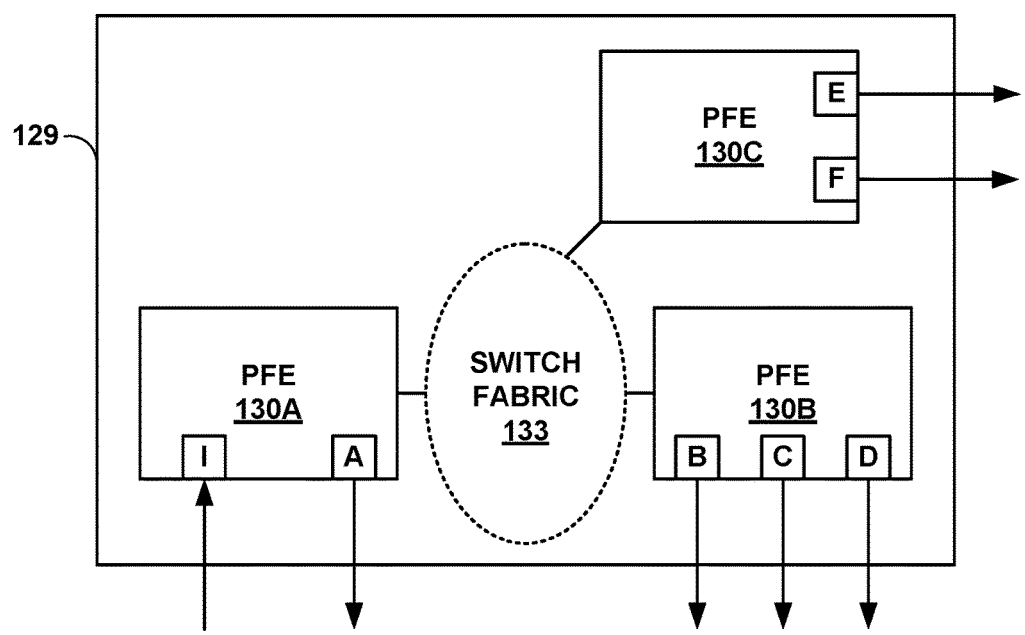
FIG. 6 is a block diagram illustrating an example chassis of a routing node implementing multicast replication for OAM packet forwarding.

FIG. 6 is a block diagram illustrating an example chassis 129 implementing multicast replication for OAM packet forwarding. In the example shown in FIG. 6, an OAM packet is to be forwarded from PFE 130A, and copies of the OAM packet are output from interfaces B-F of PFEs 130B-130C of the routing node. The principles of this disclosure may apply, for example, in the situation in which a routing node having a switch fabric performs multicast replication.

In some implementations of routing nodes having other types of forwarding plane architectures, the routing node may not have a switch fabric, or the switch fabric may be an "active" fabric that performs the multicast replication in the switch fabric, or multicast replication may be performed through a mechanism that sends the packet for replication to two other PFEs determined dynamically. Instead, routing engine 26 may create generic forwarding information and store this generic forwarding information to FIB 46A. For example, the generic forwarding information may be expressed as follows:

TABLE 9

| Routes | NHs | NH Action Identifier |
|---|---|---|
| {I1, . . . , IN} | {I1, . . . , IN} | {Replicate} |

This abstract, generic forwarding information states that packets destined for particular routes {I1, . . . , IN} should be replicated and sent out to next hops {I1, . . . , IN}. The NH action identifier identifies that the action of next hop "replicate" should be applied, i.e., multicast replication should be performed. Based on the generic forwarding information of FIB 46A provided by the upper-level software, kernel 42 invokes forwarding structure control module 52 to create a multicast replication tree that takes into account the limitations of the underlying forwarding plane architecture.

Alternatively, forwarding structure OAM configuration module 56 of one of PFEs 30 initiates creation of the multicast distribution tree based on the generic forwarding information provided by the higher-level software process (e.g., a multicast protocol or a routing protocol). In this case, forwarding structure OAM configuration module 56 may make upcalls to forwarding structure control module 52 to obtain information such as indices, and forwarding structure control module 52 keeps track of the information doled out to PFEs 30.

In this way, the techniques of the disclosure allow routing engine 26 to maintain an abstract view of the forwarding information that it creates for FIB 46A without requiring any knowledge of the limitations of the underlying forwarding plane architecture. Thus, routing protocols 40 may create and store generic forwarding information even when such forwarding information is not in a form that is optimal for use by one or more of PFEs 30. Routing engine 26 therefore need not be concerned with the underlying intricacies of forwarding plane architecture, but rather is platform-independent for purposes of OAM packet forwarding.

Moreover, the techniques described herein are not limited to derivation of next hops, but may also apply to derivation of interfaces or other forwarding structures. For example, the techniques may also apply to automatically sensing some condition on the fly, and based on the sensed condition, forming the interfaces on which to forward OAM packets.

Figure 7:
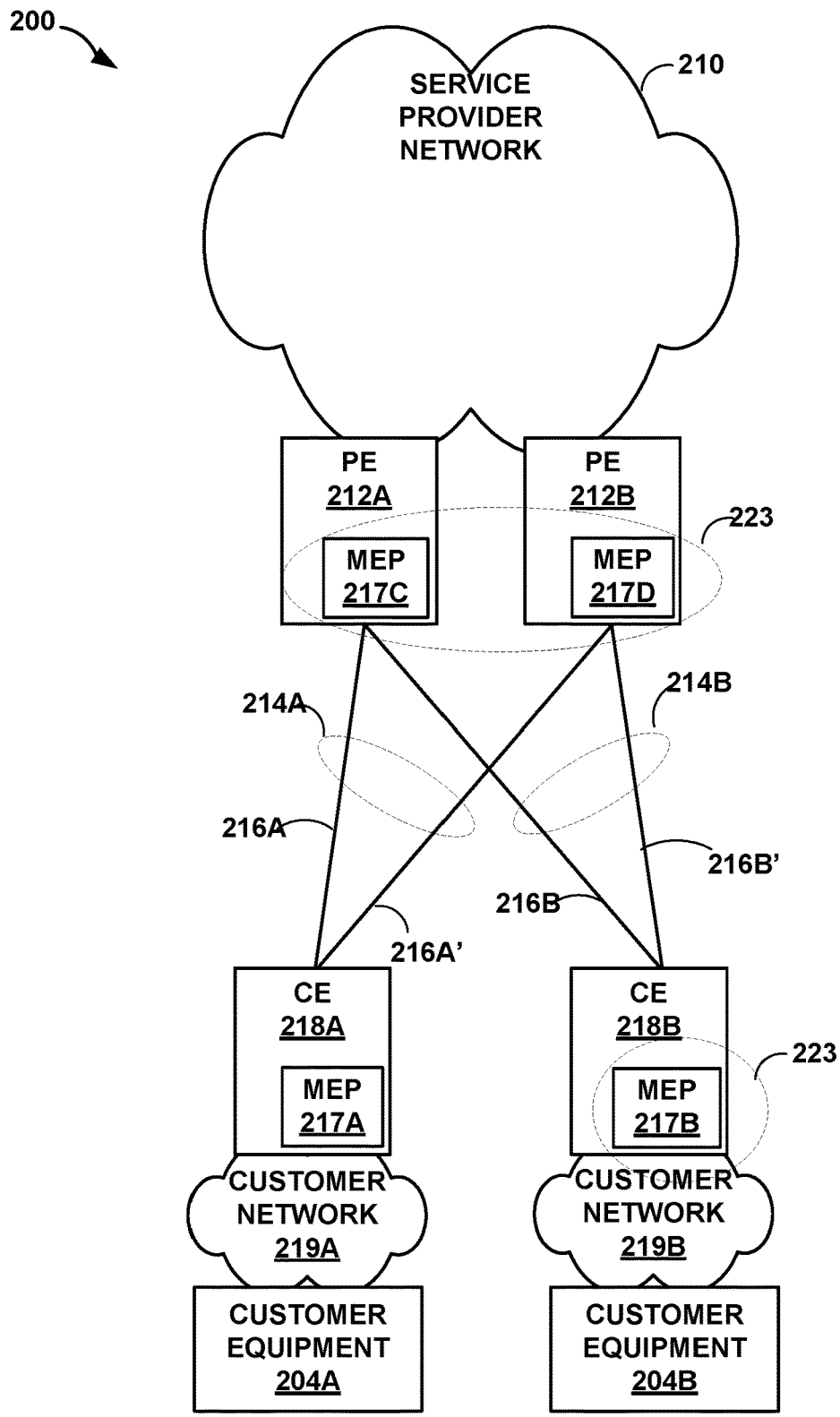
FIG. 7 is a block diagram illustrating an example network system in which a customer edge router sprays OAM traffic in accordance with service instances within a maintenance association and domain in accordance with the principles of the techniques of this disclosure.

FIG. 7 is a block diagram illustrating another example network system 200 in which a customer edge router sprays OAM traffic in accordance with service instances within a maintenance association and domain in accordance with the principles of the techniques of this disclosure. In accordance with techniques described in this disclosure, one or more users or administrators of service provider network 210 may also establish various abstractions useful for managing maintenance operations for particular associations and domains. In other words, OAM packet forwarding may be configured to spray OAM packets in accordance to maintenance end points (MEPs) designated within the same maintenance associations MA and maintenance domains MD.

For example, the administrators may establish a Maintenance Domain (MD) specifying that PE routers 212 of a given Ethernet segment, such as Ethernet segments 214A and 214B, support CFM maintenance operations and are configured with the same MD identifier that uniquely identifies a particular MD, such as the MD identifier configured on CE routers 218. In other words, the MD specifies the network or part of the particular domain for which faults in connectivity may be managed and/or observed.

The administrators may further sub-divide the MD into one or more Maintenance Associations (MA). A MA may represent a logical grouping that generally comprises a set of those CE routers 218 included within the MD and established to verify the integrity of a single service instance. A service instance may, for example, represent a portion, e.g., network devices, of a provider network that a given customer can access to query a status of services delivered for that customer. In the example of FIG. 7, CE router 218B and PE routers 212A and 212B may form MA 223. To establish a MA, the administrators may configure a respective one of Maintenance association End Points (MEP) 217A-217D ("MEPs 217") within each of CE routers 218 and PE routers 212. In this case, MEP 217B, MEP 217C, and MEP 217D may be configured as MA 223. Each of MEPs 217B, 217C, and 217D may represent an actively managed CFM entity that generates and receives CFM Payload Data Units (PDUs) and tracks any responses. In other words, each of MEPs 217B, 217C, and 217D represents an endpoint of the same MA, such as MA 223.

The administrators may, when establishing the MA, define an MA identifier (MAID) and an MD level. The identifier may comprise an identifier that uniquely identifies the MA within the MD. The MA identifier may comprise two parts, the MD name assigned to the MD in which the MA resides and a MA name. The MD level may comprise an integer. The administrators may then, when configuring MEPs 217, associate MEPs 217 to MA 223 by configuring MEPs 217 with the same MA identifier that identifies MA 223 and the same MD level. In this respect, the MA identifier comprises the set of MEPs 217, each configured within the same MAID and MD level, established to verify the integrity of a single service instance.

In any event, once configured in this manner, MEPs 217 may each detect both connectivity failures and unintended connectivity between service instances. For example, MEP 217B at CE router 218B may periodically transmit a Connectivity Check Message (CCM) announcing the identity and configured MD level. MEP 217B may multicast this message to each of MEPs 217C and 217D included within the same MD level. Each of MEPs 217C and 217D may track the CCMs received from MEP 217B, to determine connectivity faults and unintentional connectivity. For example, MEP 217C may detect a connectivity fault by determining, based on received CCMs from CE router 218B, a list of connected MEPs and comparing this list to a list of those MEPs within the same MD level. If the list of connected MEPs includes less MEPs than those expected or configured within each of MEPs 217, then the MEPs 217 may determine that CE router 218B lacks a desired connectivity. This use of lists is one exemplary way of implementing connectivity checks, and the techniques of this disclosure should not be limited in this respect.

As another example, MEPs 217 at PE routers 212 may detect a connectivity fault based on a loss of received CCMs. In some instances, MEP 217B at CE router 218B may maintain a threshold by which to determine whether a connectivity fault occurs. The threshold may be configurable by an administrator. In any case, MEPs 217C and 217D may monitor receipt of CCMs from MEP 217B. MEPs 217C and 217D may determine a length or interval of time between receipt of successive CCMs from MEP 217B and compares this interval to the threshold, if only one threshold is maintained, or the corresponding one of a plurality of thresholds, in instances where the MEP maintains a threshold for each MEP. If the interval exceeds the threshold, the MEPs 217 may determine that MEP 217B lacks a desired connectivity. If the interval does not exceed the threshold, the MEPs 217C and 217D determine that MEP 217B is connected.

In some instances, each of MEPs 217 may implement the plurality of thresholds as a timer that is continually reset upon receipt of a CCM sprayed from MEP 217B at CE router 218B. In these instances, each of MEPs 217C and 217D may reset the timer to the threshold value upon receipt of a CCM sprayed from a corresponding one of MEPs 217. The threshold value may be configurable by an administrator. If the timer reaches zero, the MEP may determine that a corresponding one of MEPs 217 lacks the desired connectivity. While a number of examples are described herein by which to determine a connectivity fault, the techniques of this disclosure should not be limited to any one of the above examples. Instead, the techniques described herein may be implemented by a network device to detect a fault based on a sprayed CCM. MEPs 217 may execute the continuity check protocol to automatically, e.g., without any administrator or other user oversight after the initial configuration, exchange these CCM messages according to a configured or, in some instances, set period. MEPs 217 may, in other words, implement the continuity check protocol to perform fault detection.

Figure 8:
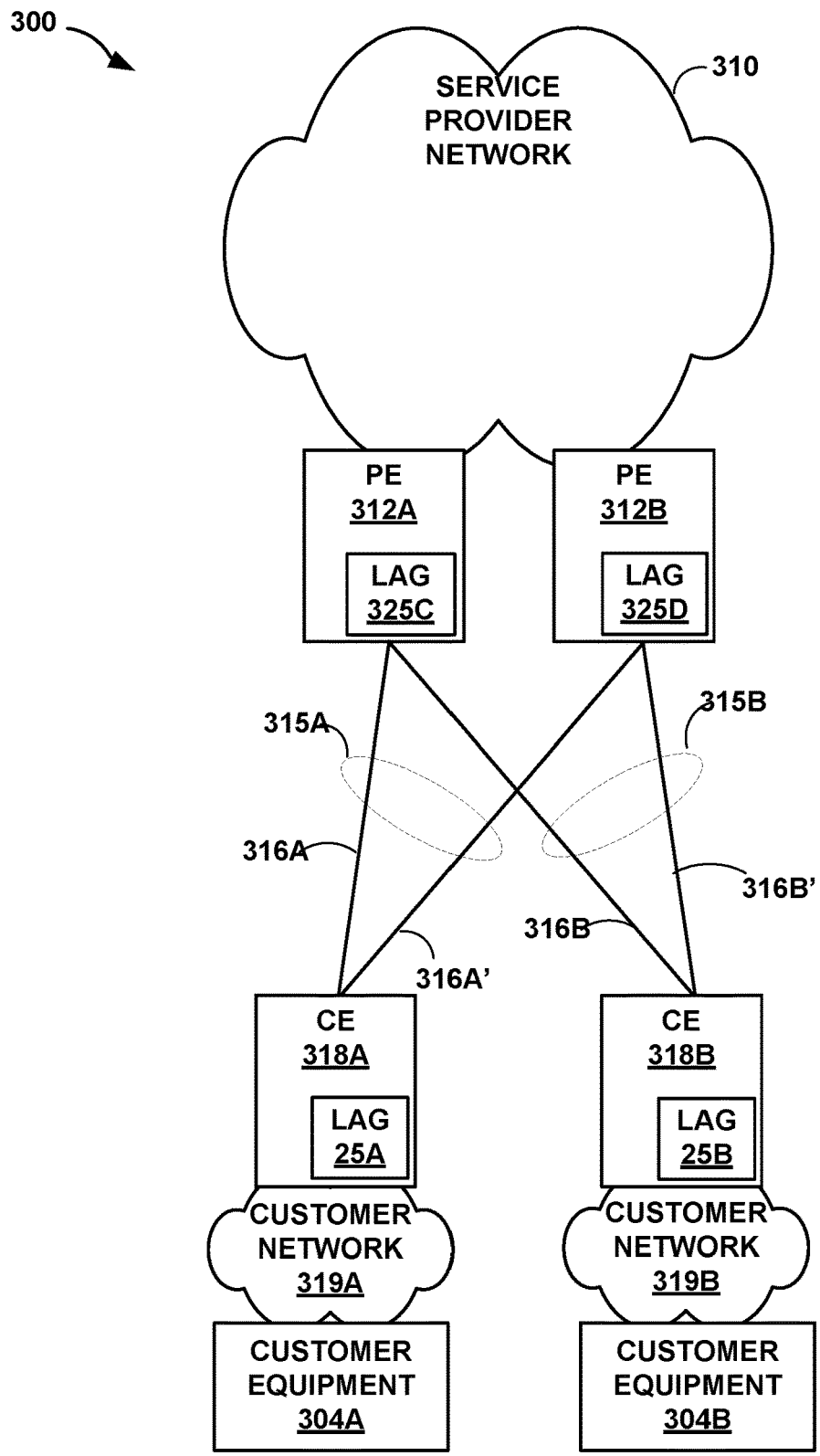
FIG. 8 is a block diagram illustrating an example network system that implements OAM packet forwarding for a multi-chassis link aggregation control protocol in accordance with one or more techniques of the present disclosure.

FIG. 8 is a block diagram illustrating another example network system 300 that implements OAM packet forwarding for a multi-chassis link aggregation control protocol in accordance with one or more techniques of the present disclosure. The multi-homed setup in FIG. 8 may further configure the CE routers 318 and PE routers 312 to aggregate links 316A, 316A', 316B, and 316B' to form multi-chassis link aggregation group (MC-LAG) 315A and 315B. MC-LAG is an extension of LAG that enables inter-chassis (which may be considered "inter-device" for practical purposes) coordination of link aggregation (LA). In other words, MC-LAG enables two chassis or devices to communicate with one another to support LAGs that span chassis.

For instance, LAG modules 325A, 325B, and/or 325C may utilize LACP to attach interfaces of PE routers 312A, 312B, and CE routers 318A, and 318B to an aggregator associated with MC-LAG 315A and 315B and modify the default configuration of the interfaces in accordance therewith. MCLAG 315A and 315B may enable CE routers 318 and PE routers 312 to more efficiently utilize links 316 by treating links 316 as a single logical link. In forming LAGs 315A and 315B, CE routers 318 may configure the virtual port that aggregates underlying physical ports of CE routers 318 that are coupled to links 316. CE routers 318 may then transparently send traffic via the active one of links 316 via the virtual port and perform L2 learning with respect to the virtual port rather than the underlying physical ports (where the term "transparently" refers to the aspect of LAG in which the access device itself is unaware of the underlying physical ports and views LAGs 315A or 315B as a single port in terms of L2 switching, L2 learning and other L2 operations).

For instance, CE router 318A may send data to service provider network 310 using MC-LAG 315A and the transmission may be distributed between links 316A and 316B, thereby increasing throughput between service provider network 310 and CE router 318A. However, as an aggregated link, failure detection of each link requires spraying an OAM packet on each of the aggregated links. In accordance with the techniques of this disclosure, OAM packets may also be forwarded on each individual link within an aggregated set of links of an MC-LAG configuration.

The techniques described in this disclosure may be implemented in hardware or any combination of hardware and software (including firmware). Any features described as units, modules, or components may be implemented together in an integrated logic device or separately as discrete but interoperable logic devices. If implemented in hardware, the techniques may be realized in a processor, a circuit, a collection of logic elements, or any other apparatus that performs the techniques described herein. If implemented in software, the techniques may be realized at least in part by a non-transitory computer-readable storage medium or computer-readable storage device encoded with, having stored thereon, or otherwise comprising instructions that, when executed, cause one or more processors, such as programmable processor(s), to perform one or more of the methods described above. The non-transitory computer-readable medium may form part of a computer program product, which may include packaging materials. The non-transitory computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structures or any other structure suitable for implementation of the techniques described herein. Likewise, the term "control unit," as used herein, may refer to any of the foregoing structures or any other structure suitable for implementation of the techniques described herein. In addition, in some aspects, the functionality described herein may be provided within dedicated software and hardware units configured to perform the techniques of this disclosure. Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various examples have been described. These and other examples are within the scope of the following claims.

What is claimed is:

1. A method comprising:
   determining, by a multi-homed customer edge (CE) router coupled by an intermediate network to a plurality of provider edge (PE) routers that provide an active-active configuration for an Ethernet Virtual Private Network (EVPN), whether a packet that is to be forwarded is an operations, administration, and management (OAM) packet;
   in response to determining that the packet comprises an OAM packet, replicating, by the CE router, the OAM packet for a plurality of interface links of an Ethernet segment associated with the CE router, the Ethernet segment having an Ethernet segment identifier (ESI), and each of the plurality of PE routers being configured as part of the Ethernet segment and to have the ESI;
   configuring forwarding instructions to the plurality of interface links of the Ethernet segment associated with the CE router to forward the replicated OAM packets; and
   forwarding the replicated OAM packets on the plurality of interface links of the Ethernet segment associated with the CE router to the plurality of PE routers to cause the replicated OAM packets to reach each of a plurality of maintenance end points (MEPs) via the plurality of PE routers to detect failure on each of the plurality of interface links, the plurality of MEPs and a MEP of the multi-homed CE router forming a common maintenance domain and a common maintenance association.

2. The method of claim 1, wherein configuring forwarding instructions comprises:
   creating a set of forwarding structures for use in forwarding the replicated OAM packets;
   providing the set of forwarding structures to a forwarding structure control module of the CE router;
   creating, by the forwarding structure control module, a set of interface forwarding structures for installation in the forwarding plane based on the set of forwarding structures, wherein creating the set of interface forwarding structures comprises creating the set of forwarding structures in accordance with the plurality of interface links of the Ethernet segment associated with the CE router; and
   installing the set of forwarding structures within the forwarding plane.

3. The method of claim 1, wherein determining whether the packet comprises an OAM packet comprises determining whether the OAM packet comprises a connectivity check message (CCM) in accordance with a continuity check protocol (CCP).

4. The method of claim 1, further comprising:
   configuring the CE router to be a member of the maintenance association, wherein the maintenance association comprises a logical grouping of the CE router and the plurality of MEPs.

5. The method of claim 4, wherein configuring forwarding instructions to the plurality of interface links of an Ethernet segment associated with the CE router comprises configuring the forwarding instructions in accordance with the interface links associated with the maintenance association of the CE router.

6. The method of claim 1, wherein configuring forwarding instructions to the plurality of interface links of an Ethernet segment associated with the CE router comprises configuring the CE router to be a member of the maintenance domain.

7. The method of claim 6, wherein configuring forwarding instructions to the plurality of interface links of an Ethernet segment associated with the CE router comprises configuring the forwarding instructions in accordance with the interface links associated with the maintenance domain of the CE router.

8. The method of claim 1, wherein configuring forwarding instructions to the plurality of interface links of an Ethernet segment associated with the CE router comprises a multicast replication instruction for forwarding the replicated OAM.

9. A network device comprising:
   a processor configured to execute an Ethernet Virtual Private Network (EVPN) protocol to configure the network device to participate as one of a plurality of customer edge (CE) routers that provide an active-active configuration for an Ethernet segment coupling the CE routers to a plurality of provider edge (PE) routers, wherein the processor is configured to:
      determine whether a packet that is to be forwarded is an operations, administration, and management (OAM) packet;
      in response to determining that the packet comprises an OAM packet, replicate the OAM packet for a plurality of interface links of an Ethernet segment associated with the CE router, the Ethernet segment having an Ethernet segment identifier (ESI), and each of the plurality of PE routers being configured as part of the Ethernet segment and to have the ESI;
      configure forwarding instructions to the plurality of interface links of the Ethernet segment associated with the CE router to forward the replicated OAM packets;
      forward the replicated OAM packets on the plurality of interface links of the Ethernet segment associated with the CE router to the plurality of PE routers to cause the replicated OAM packets to reach each of the plurality of maintenance end points (MEPs) via the plurality of PE routers to detect failure on each of the plurality of interface links, the plurality of MEPs and a MEP of the multi-homed CE router forming a common maintenance domain and a common maintenance association.

10. The network of claim 9, wherein the processor configured to configure forwarding instructions comprises configuration to:
   create a set of forwarding structures for use in forwarding the replicated OAM packets;
   provide the set of forwarding structures to a forwarding structure control module of the CE router;
   create a set of interface forwarding structures for installation in the forwarding plane based on the set of forwarding structures, wherein creating the set of interface forwarding structures comprises creating the set of forwarding structures in accordance with the plurality of interface links of an Ethernet segment associated with the CE router; and
   install the set of forwarding structures within the forwarding plane.

11. The network device of claim 9, wherein the OAM packet comprises a connectivity check message (CCM) in accordance with a continuity check protocol (CCP).

12. The network device of claim 9, wherein the plurality of interface links are associated with the maintenance association of the CE router.

13. The network device of claim 12, wherein the forwarding instructions to the plurality of interface links of an Ethernet segment associated with the CE router comprises instructions associated with the maintenance association of the CE router.

14. The network device of claim 9, wherein the plurality of interface links are associated with the maintenance domain of the CE router.

15. The network device of claim 14, wherein the forwarding instructions to the plurality of interface links of an Ethernet segment associated with the CE router comprises instructions associated with the maintenance domain of the CE router.

16. The network device of claim 9, wherein the forwarding instructions to the plurality of interface links of an Ethernet segment associated with the CE router comprises a multicast replication instruction for forwarding the replicated OAM packets.

17. A non-transitory computer-readable storage medium having stored thereon instructions that, when executed, cause a processor to:
   determine whether a packet that is to be forwarded is an operations, administration, and management (OAM) packet;
   in response to determining that the packet comprises an OAM packet, replicate the OAM packet for a plurality of interface links of an Ethernet segment associated with the CE router, the Ethernet segment having an Ethernet segment identifier (ESI), and each of the plurality of PE routers being configured as part of the Ethernet segment and to have the ESI;
   configure forwarding instructions to the plurality of interface links of the Ethernet segment associated with the CE router to forward the replicated OAM packets; and
   forward the replicated OAM packets on the plurality of interface links of the Ethernet segment associated with the CE router to the plurality of PE routers to cause the replicated OAM packets to reach each of a plurality of maintenance end points (MEPs) via the plurality of PE routers to detect failure on each of the plurality of interface links, the plurality of MEPs and a MEP of the multi-homed CE router forming a common maintenance domain and a common maintenance association.

18. The non-transitory computer-readable storage medium of claim 17, wherein the instructions further comprise instructions that, when executed, cause a processor to:
   create a set of forwarding structures for use in forwarding the replicated OAM packets;
   provide the set of forwarding structures to a forwarding structure control module of the CE router;
   create a set of interface forwarding structures for installation in the forwarding plane based on the set of forwarding structures, wherein creating the set of interface forwarding structures comprises creating the set of forwarding structures in accordance with the plurality of interface links of an Ethernet segment associated with the CE router; and
   install the set of forwarding structures within the forwarding plane.

19. The non-transitory computer-readable storage medium of claim 17, wherein the OAM packet comprises a connectivity check message (CCM) in accordance with a continuity check protocol (CCP).

20. The non-transitory computer-readable storage medium of claim 17, wherein the plurality of interface links are associated with the maintenance association of the CE router.

21. The non-transitory computer-readable storage medium of claim 20, wherein the forwarding instructions to the plurality of interface links of an Ethernet segment associated with the CE router comprises instructions associated with the maintenance association of the CE router.

22. The non-transitory computer-readable storage medium of claim 17, wherein the plurality of interface links are associated with the maintenance domain of the CE router.

23. The non-transitory computer-readable storage medium of claim 22, wherein the forwarding instructions to the plurality of interface links of an Ethernet segment associated with the CE router comprises instructions associated with the maintenance domain of the CE router.

24. The non-transitory computer-readable storage medium of claim 17, wherein the forwarding instructions to the plurality of interface links of an Ethernet segment associated with the CE router comprises a multicast replication instruction for forwarding the replicated OAM.

25. A method comprising:
   determining, by a multi-homed customer edge (CE) router coupled by an intermediate network to a plurality of provider edge (PE) routers that provide a multi-chassis link aggregation group (MC-LAG) configuration for an Ethernet Virtual Private Network (EVPN), whether a packet that is to be forwarded is an operations, administration, and management (OAM) packet;
   in response to determining that the packet comprises an OAM packet, replicating, by the CE router, the OAM packet for a plurality of interface links of an Ethernet segment associated with the CE router, the Ethernet segment having an Ethernet segment identifier (ESI), and each of the plurality of PE routers being configured as part of the Ethernet segment and to have the ESI;
   configuring forwarding instructions to the plurality of interface links of the Ethernet segment associated with the CE router;
   forwarding the replicated OAM packets on the plurality of interface links of the Ethernet segment associated with the CE router to the plurality of PE routers to cause the replicated OAM packets to reach each of a plurality of maintenance end points (MEPs) via the plurality of PE routers to detect failure on each of the plurality of interface links, the plurality of MEPs and a MEP of the multi-homed CE router forming a common maintenance domain and a common maintenance association.

* * * * *